US011044149B1

(12) United States Patent
Roschewsk et al.

(10) Patent No.: US 11,044,149 B1
(45) Date of Patent: Jun. 22, 2021

(54) SYSTEM AND METHOD FOR CONDITIONING AND CERTIFYING NETWORK EQUIPMENT

(71) Applicant: AT&T Intellectual Property I, L.P., Atlanta, GA (US)

(72) Inventors: Robert Roschewsk, Washington, NJ (US); Srinandan Hullahalli, Frisco, TX (US); Sunil Maloo, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/804,837

(22) Filed: Feb. 28, 2020

(51) Int. Cl.
| | |
|---|---|
| *G06F 13/00* | (2006.01) |
| *H04L 12/24* | (2006.01) |
| *H04L 29/08* | (2006.01) |
| *H04W 4/80* | (2018.01) |

(52) U.S. Cl.
CPC ...... *H04L 41/0806* (2013.01); *H04L 41/0826* (2013.01); *H04L 41/0893* (2013.01); *H04L 67/16* (2013.01); *H04W 4/80* (2018.02)

(58) Field of Classification Search
CPC . H04L 41/0806; H04L 67/16; H04L 41/0893; H04L 41/0826; H04W 4/80
USPC ................. 709/220–222, 230, 232
See application file for complete search history.

(56) References Cited

U.S. PATENT DOCUMENTS

| | | | |
|---|---|---|---|
| 5,307,465 A | 4/1994 | Iki | |
| 5,655,148 A | 8/1997 | Richman et al. | |
| 6,055,227 A | 4/2000 | Lennert et al. | |
| 6,404,744 B1 | 6/2002 | Saito | |
| 7,295,960 B2 | 11/2007 | Rappaport et al. | |
| 8,402,120 B1 | 3/2013 | Perkinson | |
| 8,532,095 B2 | 9/2013 | Mammoliti et al. | |
| 8,635,316 B2 | 1/2014 | Barnhill | |
| 8,761,350 B2 | 6/2014 | Faulkner et al. | |

(Continued)

FOREIGN PATENT DOCUMENTS

| | | |
|---|---|---|
| CN | 101232395 | 7/2008 |
| CN | 106685733 | 5/2017 |

(Continued)

OTHER PUBLICATIONS

Greenberg et al., "A Clean Slate 4D Approach to Network Control and Management," ACM SIGCOMM Computer Communication Review, Oct. 2005, 14 pages.
Gunes et al., "Practical Issues of Implementing a Hybrid Multi-NIC Wireless Mesh-Network," Computer Science, 2008, 50 pages.
Haen et al., "Development of a dynamic network monitoring tool," CERN-THESIS-2010-106, 55 pages.

(Continued)

*Primary Examiner* — Kenneth R Coulter
(74) *Attorney, Agent, or Firm* — Amin, Turocy & Watson, LLP

(57) ABSTRACT

An architecture for automatically preconditioning and certifying the deployment of network hardware prior to installation of network services. A method can comprise in response to receiving electrical power from a mains power supply, downloading specific executable instructions to facilitate execution of an operating system kernel by the processor; determining that the operating system kernel has attained an operational status; based on the determining, establishing a pre-boot execution network environment with a device of a group of devices; initializing a group of protocol services; and facilitating retrieval of configuration data from the device using the group of protocol services.

20 Claims, 12 Drawing Sheets

(56) References Cited

U.S. PATENT DOCUMENTS

| | | | |
|---|---|---|---|
| 8,966,018 | B2 | 2/2015 | Bugwadia et al. |
| 9,130,847 | B2 * | 9/2015 | Peterson ............ H04L 41/0866 |
| 9,253,034 | B1 | 2/2016 | Krishnamurthy et al. |
| 9,553,661 | B2 | 1/2017 | Meng et al. |
| 9,614,745 | B2 | 4/2017 | Mathur et al. |
| 10,057,184 | B1 | 8/2018 | Prahlad et al. |
| 10,212,031 | B2 | 2/2019 | Subramanian et al. |
| 10,365,931 | B2 | 7/2019 | Puri et al. |
| 10,432,474 | B2 | 10/2019 | Nair et al. |
| 10,797,956 | B2 * | 10/2020 | Vadapalli ............ G06F 9/45558 |
| 10,904,088 | B2 * | 1/2021 | Devireddy .......... H04L 41/0893 |
| 2005/0157730 | A1 | 7/2005 | Grant et al. |
| 2007/0268506 | A1 | 11/2007 | Zeldin |
| 2007/0268514 | A1 | 11/2007 | Zeldin et al. |
| 2007/0268515 | A1 | 11/2007 | Freund et al. |
| 2014/0379876 | A1 * | 12/2014 | Peterson ............ H04L 41/0893 709/220 |
| 2018/0052945 | A1 | 2/2018 | Avazpour et al. |
| 2020/0162317 | A1 * | 5/2020 | Devireddy .............. H04L 41/28 |
| 2020/0162330 | A1 * | 5/2020 | Vadapalli .................. G06F 8/61 |
| 2021/0014121 | A1 * | 1/2021 | Vadapalli ................ H04L 67/34 |

FOREIGN PATENT DOCUMENTS

| | | |
|---|---|---|
| CN | 108234183 | 6/2018 |
| WO | 2008092951 A2 | 9/2008 |
| WO | 2013037233 A1 | 3/2013 |
| WO | 2019125239 A1 | 6/2019 |

OTHER PUBLICATIONS

Heinisch et al., "Efficient configuration management of automotive software," Computer Science, 2004, 10 pages.

"LLNL's NeMS: Network Mapping System," https://ipo.llnl.gov/technologies/software/llnls-nems-network-mapping-system, 3 pages.; entered into Application on Jan. 8, 2021.

Shiau et al., "The Design and Implementation of a Novel Open Source Massive Deployment System," Appl. Sci. 2018, 8(6), 965, 20 pages.

Staub et al., "Secure Remote Management and Software Distribution for Wireless Mesh Networks," In Proceedings of the 7th International Workshop on Applications and Services in Wireless Networks. ASWN 2007, 8 pages.

* cited by examiner

SYSTEM AND METHOD FOR CONDITIONING AND CERTIFYING NETWORK EQUIPMENT

TECHNICAL FIELD

The disclosed subject matter provides systems and methods for automatically preconditioning and certifying the deployment of network hardware prior to installation of network services.

BACKGROUND

The physical installation of new network equipment/devices, by a contractor, in a data center or central office (e.g., cloud data centers), for example, can typically lead the availability of outside network connectivity to remote operation teams by many weeks or months. Errors in the installation of the new network equipment/devices and/or defects in installed network equipment/devices, in many instances, can on occasion not be detected until the remote operations teams commence configuring the new network equipment/devices. Consequently, corrective actions at that juncture in time can significantly delay commencement of data center or central office operations, leading to lost productivity and other added incurred costs.

DETAILED DESCRIPTION

Figure 1:
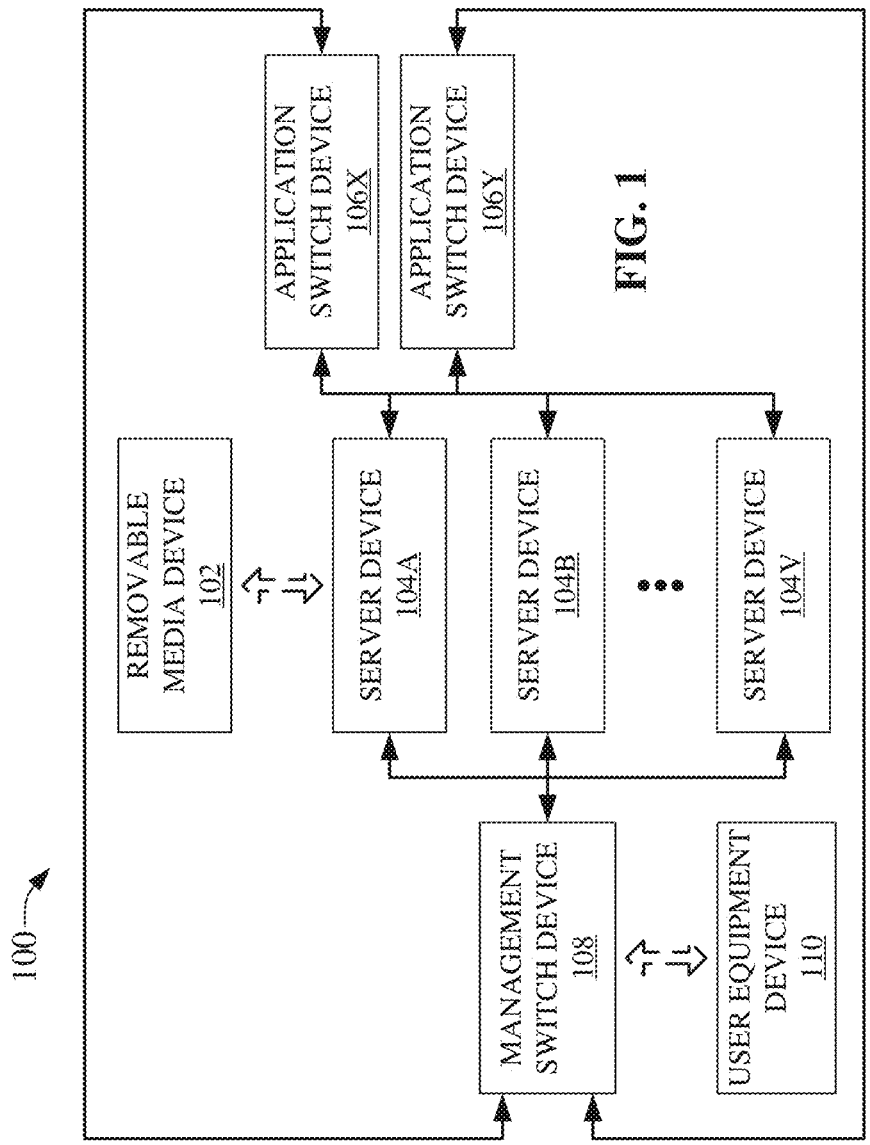
FIG. 1 is an illustration of a system for automatically preconditioning and certifying the deployment of network hardware prior to installation of network services, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise in response to receiving electrical power from a mains power supply, downloading defined, definable, determined, determinable, specific, or specified executable instructions to facilitate execution of an operating system kernel by the processor; based on determining that the operating system kernel has attained an operational status, establishing a pre-boot execution network environment with a network device of a group of networked devices; initializing a group of protocol services; and facilitating retrieval of configuration data from the network device using the group of protocol services.

In accordance with further embodiments, the subject disclosure describes a method and/or process, comprising a series of acts that, for example, can include: in response to receiving electrical power from a mains power supply, downloading specific executable instructions to facilitate execution of an operating system kernel by a processor; determining that the operating system kernel has attained an operational status; based on the determining, establishing a pre-boot execution network environment with a device of a group of devices; initializing a group of protocol services; and facilitating retrieval of configuration data from the device using the group of protocol services.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: in response to receiving electrical power from a mains power supply, downloading specific executable instructions to facilitate execution of an operating system kernel by the processor; determining that the operating system kernel has attained an operational status; based on the determining, establishing a pre-boot execution network environment with a device of a group of devices; initializing a group of protocol services; and facilitating retrieval of configuration data from the device using the group of protocol services.

Now with reference to the Figures, FIG. 1 illustrates a system 100 for automatically preconditioning and certifying the deployment of network hardware prior to installation of network services, in accordance with various embodiments. System 100 can comprise a removable media device 102, such as a universal serial bus (USB) device, that can be coupled to the server device 104A. It should be noted in regard to communicatively coupling removable media device 102 to server device 104A that removable media device 102 can be both communicatively coupled and/or communicatively decoupled from service device 104A with equal facility. Moreover, in accordance with various embodiments, removable media device 102 can be communicatively coupled to any of server device 104A . . . server device 104V with equal facility and/or functionality without departing the ambit of the subject disclosure. At this juncture it should also be noted that server device 104A . . . server device 104V can form a grouping or group of server devices. Accordingly, it will be comprehended by those skill in the art that the selection of server device 104A can be a random choice from a grouping of server device 104A . . . server device 104V. Additionally and/or alternatively, in some embodiments, server device 104A can be uniquely configured to comprise a defined port for the specific acceptance of removable media device 102. With reference to the group of server device 104A . . . server device 104V, this grouping, without limitation or loss of generality, unless otherwise noted, can collectively refer to as server device 104.

While the subject application is disclosed in terms of using a removable media device 102, such as a USB device, the disclosure is not so limited, as a portable device comprising at least a storage aspect and/or a communication port (or communication facility/functionality) to effect and/or facilitate wired and/or wireless communication with the one or more server device 104 is contemplated. In regard to wireless communication with server device 104, in addition to typical wireless communication standards generally utilized by small form factor (SFF) devices, contact communication, wherein removable media device 102 is brought into contact with (or in near proximity to) one or more of the group of server devices 104, is contemplated as falling within the scope of the subject disclosure. In accordance with various embodiments, it is also contemplated that removable media device 102 can be brought into a near contact with one of the grouping of server devices 104. In additional and/or alternative embodiments, a wired connectivity interface can be used to facilitate coupling and/or communication between one or more of the group of server devices 104 and removable of media device 102.

The removable media device 102, as noted above, can be connected to server device 104A, for example. For purposes of this description, server device 104A can be referred to as a "seed server" device. The seed server device (e.g., server device 104A), while being noted in this disclosure as being a server device in a group of server devices 104, need only be a newly deployed device capable of communication (wired and/or wireless) with the removable media device 102. Therefore, in some instances, the seed server device can be a device with minimal computing power in the conventional sense. Examples of such seed server devices can be an Internet of Things (IoT) small form factor devices capable of effective and/or operative communication with a network topology. Other types of mechanisms, machines, devices, apparatuses, and/or instruments that can be utilized as seed server devices can include any device comprising at least a processor and/or a capability of effective and/or operative communication with one or more disparate network topology and/or one or more network paradigm. For instance, in some embodiments, the seed server device can include mechanisms, machines, devices, facilities, and/or instruments, such as virtual reality (VR) devices, wearable devices, heads up display (HUD) devices, machine type communication devices, and/or wireless devices that communicate with radio network nodes in a cellular or mobile communication system. In various other embodiments, the seed server device can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with for example, orbiting satellites and/or associated aeronautical vehicles, and the like.

Removable media device 102 can have persisted to it a bootable system image (e.g., a grouping of software code, or software instructions, that when executed by one or more processors facilitates performance of operations). This bootable system image when executed by a processor associated with a device (e.g., server device 104A), and in response to power up of (or when power is supplied to) the device can establish a operational kernel operating system on the device. The kernel operating system executing on the device can provide an interface (e.g., command line, human machine interface (HMI), graphical user interface (GUI), . . . ) between a user of the device and the various underlying and/or associated computer hardware and/or peripheral devices that can comprise the device.

Once the seed server device (e.g., server device 104A) as booted up and has become functionally operable, with a version of the system image from the removable media device 102, the seed server device can configure a pre-boot execution environment (PXE) network with a private Internet Protocol (IP) address(es). Further, the seed server device can also execute and/or instantiate one or more dynamic host configuration protocol (DHCP), trivial file transfer protocol (TFTP), hypertext transfer protocol (HTTP), and/or link layer discovery protocol (LLDP) services and/or service or server processes. In regard to the executing/instantiated DHCP, TFTP, HTTP, and/or LLDP services and/or service these can be facilitated, implemented, and/or effectuated as one or more virtual machines that can be established and/or be operational on the seed server device.

Contemporaneously or subsequently to power up and/or the initiation of the seed server device (e.g., server device 104A), in one or more embodiments, the remaining server devices (e.g., server device 104B . . . server device 104V), using the established PXE environment (e.g., established by the seed server device (e.g., server device 104A)), can be booted from removable device 102, when electrical power is supplied to each of the remaining server devices (e.g., server device 104B . . . server device 104V). In additional and/or alternative embodiments, the remaining server devices (e.g., server device 104B . . . server device 104V) can be placed in a state of hiatus until the seed server device (e.g., server device 104A) is sufficiently operational and/or the PXE environment is established, after which the remaining server devices (e.g., server device 104B . . . server device 104V) can download and install versions (e.g., where server device 104B . . . server device 104V comprise devices associated with disparate architectures, disparate versions of the bootable image may need to be downloaded and/or installed) of the bootable image from the seed server device (e.g., server device 104A). It should be noted in this regard—where server device 104B . . . server device 104V are placed in states of hibernation until the seed server device (e.g., server device 104A) becomes accessible and/or operational—that one or more disparate bootable image can have been stored to a storage device associated with the seed server device (e.g. server device 104A).

Once the remaining server devices (e.g., server device 104B . . . server device 104V) have been booted and/or are operational, each of the remaining server devices (e.g., server device 104B . . . server device 104V) can instantiate a LLDP Daemon on all interfaces associated with each of the remaining server devices (e.g., server device 104B . . . server device 104V).

At this juncture: the seed server device (e.g., server device 104A) can execute a process to harvest configuration data from all server devices that form the grouping of server devices (e.g., server device 104A . . . server device 104V). In order to effectuate collection of configuration data from all server devices comprising the grouping of server devices (e.g., server device 104A . . . server device 104V), server device 104A (e.g., the seed server device) can use facilities and/or functionalities provided by a suite of executable instructions that effectuates out-of-band management, such as integrated dell remote access controllers (iDRAC).

Out-of-band management involves the use of management interfaces (or serial ports) associated with networking equipment devices (e.g., device 104A . . . server device 104V) for the managing networking equipment devices. Out-of band management can allow mobile network operator (MNO) entities to establish trust boundaries in accessing management functionalities and/or to apply them to network resources (e.g., software in execution and/or network devices). Out-of-band management can also be used to ensure management connectivity (including the ability to determine the status of any network component device) independent of the status of other in-band network components. Out-of-band management generally involves the use of a dedicated management channel for device maintenance. Out-of-band management typically allows system administrators to monitor and/or manage server devices (e.g. grouping of server devices 104, telecommunication devices, etc.) and/or other network affiliated devices (e.g., IoT devices, SFF devices, peripheral devices, . . . ) by remote control without the necessity for the specific device and/or groupings of identified devices to be powered on, or whether an operating system is installed and/or functional on the specific device and/or groupings of identified devices.

For purposes of contrast, in-band management is typically based on in-band connectivity and software that must be installed on the remote system devices, and generally works when the operating system on the device is operational. In-band management, while cheaper, typically: does not allow access to firmware settings; does not make it possible to reinstall the operating system remotely; and generally cannot be used to fix problems that prevent a device from booting. In regard to the aforementioned firmware settings, these pertain to the basic input/output system (BIOS)—the firmware used to perform hardware initialization during power-on startup; and/or the unified extensible firmware interface (UEFI)—a software interface between an operating system and device firmware.

Thus, the seed server device (e.g., server device 104A) executes one or more processes to harvest configuration data from all server devices comprising the group of server devices 104 (e.g., server device 104A . . . server device 104V) using a suite of executable instructions that can facilitate and/or effectuate out-of-band management functionalities. Harvested configuration data can comprise routing data obtained from a management switch device 108; and internet protocol (IP) data upon which the routing data can have been based. This IP data can have been used to initiate/establish the PXE network, and typically can be considered as "private" IP data. Additional data that can also be obtained from the management switch device 108 can be "public" IP data. Public IP data can be data obtained through one or more facilities/functionalities provided by the suite of executable instructions that facilitates/effectuates the out-of-band management functionalities.

In the context of management switch device 108, in some embodiments, this device can form part of the grouping of server devices 104. In additional and/or alternative embodiments, management switch device 108 can be a specifically configured device to perform identified or identifiable management switch tasks. Nevertheless, management switch device 108, in accordance with various embodiments, like the group of server devices 104, can download and/or install a bootable image from removable media device 102, and/or from a determined or determinable storage partitions created by the seed server device (e.g., server device 104A) when the seed server device itself was initiated/instantiated. In various alternative embodiments, management switch device 108 can have been preconfigured, before physical installation at the remote site, with a extant and/or specific bootable image.

The seed server device (e.g., server device 104A) contemporaneously (or in parallel), or in near contemporaneity, with harvesting configuration data from the entirety of the server devices (e.g., server device 104A . . . server device 104V), can also harvest LLDP data from management switch device 108 as well as a brace of application switch devices (e.g., application switch device 106X and application switch device 106Y). While the subject disclosure is elucidated as using a brace of application switch devices (e.g., application switch device 106X and application switch device 106Y) fewer or more application switch devices are contemplated as comprising a grouping of application switch devices.

The brace application switch devices (e.g., application switch device 106X and application switch device 106Y) can be carrier-grade NAT (CGN) devices or large-scale NAT (LSN) devices. These devices can be end site devices in, for instance, residential/home networks configured with private network IP addresses that can be translated into public network IP addresses. Use of such devices permit the sharing of a small pool of public IP addresses among many end sites. Utilization of application switch devices shifts the burden of network address translation (NAT) functions and configuration to MNO entities (or the Internet service provider (ISP)).

As noted earlier, and as with management switch device 108, the brace of application switch devices (e.g., application switch device 106X and application switch device 106Y) in accordance with some embodiments can form part of the grouping of server devices 104. In alternative embodiments, the brace of application switch devices can be uniquely configured devices, configured to perform determined and/or determinable application switch tasks, such as translating IP addresses associated with a localized private home or residential network to IP addresses associated with a wider more expensive network managed and/or controlled by one or more MNO entity. The brace of application switch devices (e.g., application switch device 106X and application switch device 106Y) in various embodiments, can download and/or install bootable images pertinent to their purpose and/or functionality (e.g. an application switch device functionality) and/or in accordance with their particular hardware configuration and/or software configuration from removable media device 102. In other embodiments, the brace of application switch devices can download bootable images from the seed server device (e.g., server device 104A), wherein the seed server device facilitates and/or effectuates download of the appropriate bootable image from one or more storage aspect associated with the seed server device. In additional embodiments, the brace of application switch devices can have been pre-configured, before having been shipped and/or installed at the remote site, with an already extant and/or specific bootable image. In instances where the brace of application switch server devices have been pre-configured before shipment to the remote site, the seed server device can effectuate and/or facilitate the download and/or installation of updated firmware, hardware, and/or software patches to the brace of application server devices.

In regard to management switch device 108 and/or the brace of application switch devices (e.g., application switch device 106X and application switch device 106Y), it will be apparent to those skilled in the art that, while these devices have been depicted and described respectively as a single management switch device 108 and a pair of application switch devices 106X and 106Y, it is nonetheless within the ambit of the subject disclosure that there can be a plurality of management switch devices (e.g., more than one), and in the context of the pair of application switch devices, in some embodiments there may be but a single application switch device, or in other embodiments there can be a plethora (e.g., more than two) application switch devices.

Further, in connection with management switch device 108 and/or the brace of application switch devices (e.g., application switch device 106X and application switch device 106Y), these devices, for purposes of this disclosure and in some embodiments, need never be powered up since the above noted out-of-band management paradigm provides facilities and/or functionalities that allow system administrators (or remote processes implemented in conformance with the out-of-band management paradigm) to access, monitor, and/or manage devices remotely without the necessity for the devices at issue to be in a powered state and/or to have installed and/or functional operating systems.

Once the seed server device (e.g., server device 104A) has harvested the LLDP data from management switch device 108 and/or the brace of application switch devices (e.g., application switch device 106X and application switch device 106Y), the seed server device can consolidate and cross-check the configuration data that can have been harvested earlier from the entirety of the server devices (e.g., server device 104A . . . server device 104V), and the routing data representative of private IP addresses on the PXE network to public IP addresses with the previously harvested LLDP data obtained from management switch device 108 and/or from the brace of application switch devices to verify connections and/or interconnections between one or more of the various installed devices (e.g., entirety of the server devices—server device 104A . . . server device 104V; brace of application switch devices—application switch device 106X and application switch device 106Y; and/or management switch device 108). Additionally and/alternatively, the configuration data harvested from the entirety of the server devices (e.g., server device 104A . . . server device 104V) and representing routing data indicative of routes from private IP addresses on the PXE network to public IP addresses can be compared to pre-established configuration data (e.g., data/information containing rack locations, wiring, and routing diagrams/layouts that can outline the planned or proposed setup of a storage farm, a remote data center, or a offsite cloud service center).

The result of the foregoing consolidation and cross-checking can then be presented to a webpage that can be displayed and/or accessed by user equipment device 110 communicatively coupled, in this instance, to management switch device 108. In regard to communicatively coupling user equipment device 110 with management switch device 108, the subject disclosure is not so limited, as in some embodiments user equipment device 110 can be communicatively coupled with one or more of the grouping of server devices (e.g., server device 104A . . . server device 104V).

Additionally and/or alternatively, as a function of, or in response to, the consolidation and cross-checking a report can be generated and downloaded to user equipment device 110. Once the report has been downloaded to the user equipment device 110 a technician (e.g. user) can, at a later time and place, upload the report to a central site for further analysis and/or, if necessary, additional action. It will be noted that the rationale for uploading the report to a central server site at a subsequent time and/or place is because the data center or cloud service center will typically not have access to the wider network topologies that can be controlled by one or more MNO entities, since the data center/cloud service center, at this stage, will generally not be fully functional, and for all intents and purposes, aside from a supply of mains electricity to the above noted devices, will not have an outside network connectivity and/or be fully operable.

Figure 2:
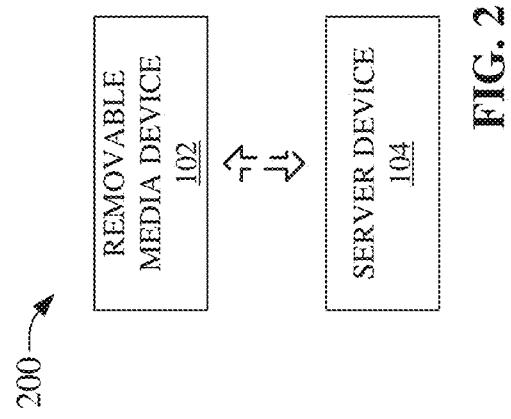
FIG. 2 is a further depiction of a system for the provision of a dynamic cloudlet fog node deployment architecture, in accordance with aspects of the subject disclosure.

With reference to FIG. 2, illustrated therein is a system 200 for automatically preconditioning and certifying the deployment of network hardware prior to installation of network services, in accordance with various embodiments. System 200 can include removable media device 102 in operative communication with server device 104 (e.g., seed server device). Removable media device 102 can have persisted to it a bootable system image that when executed by a processor associated with the seed server device can establish an operational kernel operating system on the seed server device. As noted earlier, the kernel operating system executing on the seed server device can provide an interface (e.g., command line interface, human machine interface (HMI), graphical user interface (GUI), . . . ) between a user of the seed server device (or one or more process interfacing with the seed server device) and the various underlying and/or associated computer hardware and/or peripheral devices that can comprise the seed server device.

Once the seed server device has become operable with the kernel operating system, any remaining server devices (e.g., server device 104B . . . server device 104V), in some embodiments, in response to electrical power being supplied to these remaining server devices can download and/or execute one or more bootable images from removable media device 102. As has been observed earlier in this disclosure, in various embodiments, the remaining server devices, in addition to obtaining the one or more bootable image from removable media device 102, can also obtain the one or more bootable images from one or more storage partition that can be associated with the seed server device.

Figure 3:
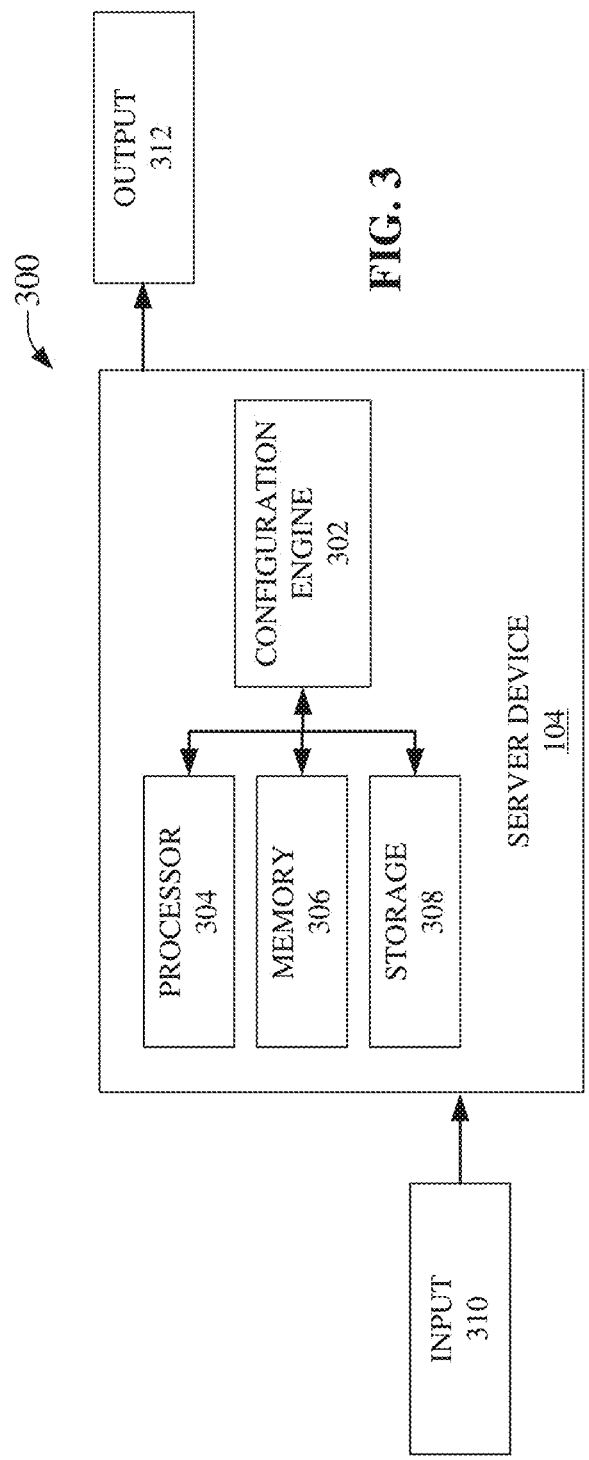
FIG. 3 provides illustration of an additional system for the provision of a dynamic cloudlet fog node deployment architecture, in accordance with aspects of the subject disclosure.

FIG. 3 provides additional illustration of a system 300 for automatically preconditioning and certifying the deployment of network hardware prior to installation of network services, in accordance with various embodiments. As depicted, system 300 provides addition detail with regard to an example server device 104. Server device 104 can comprise configuration engine 302 that can be communicatively coupled to processor 304, memory 306, and storage 308. Configuration engine 302 can be in communication with processor 304 for facilitating operation of computer and/or machine executable instructions and/or components by configuration engine 302, memory 306 for storing data and/or the computer or machine executable instructions and/or components, and storage 308 for providing longer term storage for data and/or machine and/or computer executable instructions. Additionally, server device 104 can receive input 310 for use, manipulation, and/or transformation by configuration engine 302 to produce one or more useful, concrete, and tangible result, and/or transform one or more articles to different states or things. Further, server device 104 can also generate and output the useful, concrete, and tangible result, and/or the transformed one or more articles produced by configuration engine 302, as output 312.

Configuration engine 302 can configure and/or establish a PXE network with a group of private IP addresses. Further, configuration engine 302, using the PXE network, can also execute and/or instantiate one or more DHCP service, TFTP service, HTTP service, and/or LLDP service. Additionally, configuration engine 302 can execute and/or instantiate a process to harvest configuration data from all server devices that can form a group or of server devices e.g., server device 104A . . . server device 104B). Configuration engine 302 can facilitate and/or effectuate acquisition of the configuration data using the functionalities provided by a suite of executable code that effectuates out-of-band management.

The harvested configuration data, as noted earlier can comprise routing data obtained from a management switch device 108; and internet protocol (IP) data upon which the routing data can have been based. This IP data can have been used to initiate/establish the PXE network, and typically can be considered as "private" IP data. Additional data that can also be obtained from the management switch device 108 can be "public" IP data. Public IP data can be data obtained through one or more facilities/functionalities provided by the suite of executable instructions that facilitates/effectuates the out-of-band management functionalities.

Configuration engine 302 contemporaneously, or in near contemporaneity, with harvesting configuration data from the entirety of the server devices, can also harvest LLDP data from management switch device 108 as well as a pairing of application switch devices (e.g., application switch device 106X and application switch device 106Y).

Once configuration engine 302 has harvested the LLDP data from management switch device 108 and/or the pairing of application switch devices (e.g., application switch device 106X and application switch device 106Y), configuration engine 302 can consolidate and cross-check the configuration data that can have been harvested earlier from the entirety of the server devices (e.g., server device 104A . . . server device 104V), and the routing data representative of private IP addresses on the PXE network to public IP addresses with the previously harvested LLDP data obtained from management switch device 108 and/or from the pair of application switch devices to verify connections and/or interconnections between one or more of the various installed devices. Additionally and/alternatively, the configuration data harvested from the entirety of the server devices (e.g., server device 104A . . . server device 104V) and representing routing data indicative of routes from private IP addresses on the PXE network to public IP addresses can be compared to pre-established configuration data (e.g., data/information containing rack locations, wiring, and routing diagrams/layouts that can outline the planned or proposed setup of a storage farm, a remote data center, or a offsite cloud service center).

Figure 4:
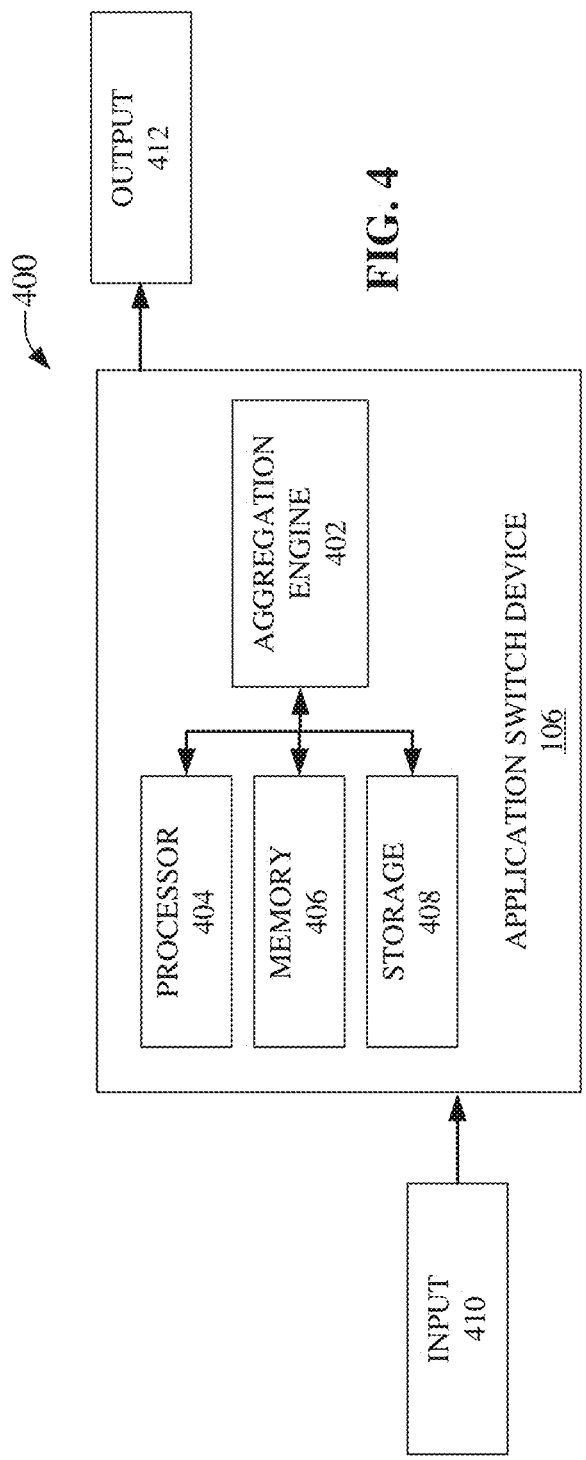
FIG. 4 provides another illustration of a system for the provision of a dynamic cloudlet fog node deployment architecture, in accordance with aspects of the subject disclosure.

FIG. 4 provides additional depiction of a system 400 for automatically preconditioning and certifying the deployment of network hardware prior to installation of network services, in accordance with various embodiments. As illustrated, system 400 provides further detail with respect to an example application switch device 106 (e.g., one of the pair of application switch devices 106X and 106Y). Application switch device 106 can include aggregation engine 402 that can be in communication with processor 404, memory 406, and storage 408. Aggregation engine 402 can be in communication with processor 404 for facilitating operation of computer or machine executable instructions and/or components by aggregation engine 402, memory 406 for storing data and/or the computer or machine executable instructions and/or components, and storage 408 for providing longer term storage of data and/or machine and/or computer executable instructions. Additionally, application switch device 106 can also receive input 410 for use, manipulation, and/or transformation by aggregation engine 402 to provide one or more useful, concrete, and tangible result and/or transform one or more articles to different states or things. Further, application switch device 106 can also generate and output the useful, concrete, and tangible result and/or the transformed one or more articles produced by aggregation engine 402 as output 412.

Aggregation engine 402 can aggregate LLDP data and transmit the aggregated LLDP back to the seed server device. Application switch device 106, as elucidated above, can be a carrier-grade NAT (CGN) device or large-scale NAT (LSN) devices. CGN devices or LSN devices are typically end site devices in, for instance, small scale residential networks or small business networks configured with private network IP addresses that can be translated into public network IP addresses. Use of CGN devices or LSN devices permit the sharing of a small group of public IP addresses among many end sites. Utilization of CGN devices or LSN devices will typically shift the burden of network address translation (NAT) functions and configuration to MNO entities (or Internet service providers (ISPs)).

Application switch device 106 in accordance with various embodiments can be any type of mechanism, machine, device, apparatus, and/or instrument comprising at least a processor and/or an ability to for effective and/or operative communication with a network topology. For instance, in some embodiments, application switch device 106 can include mechanisms, machines, devices, facilities, and/or instruments, such as virtual reality (VR) devices, wearable devices, heads up display (HUD) devices, machine type communication devices, and/or wireless devices that communicate with radio network nodes in a cellular or mobile communication system. In various other embodiments, application switch device 106 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, etc.

Figure 5:
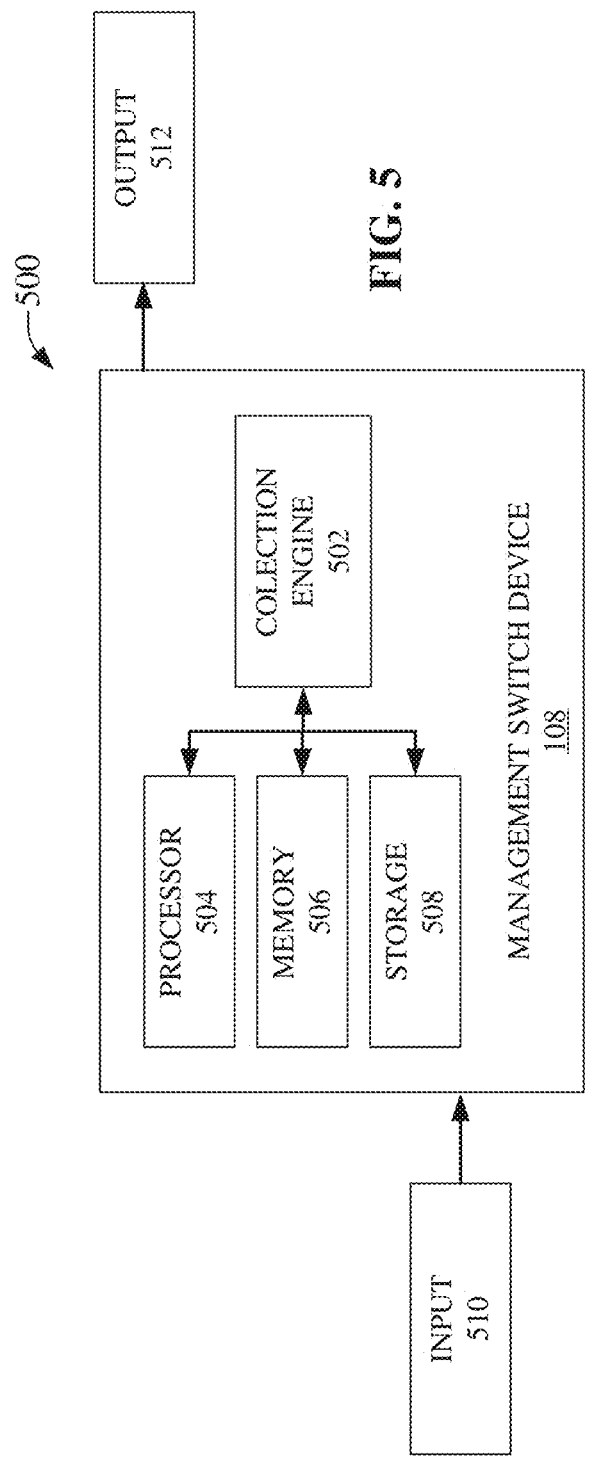
FIG. 5 provides another depiction of a system for the provision of a dynamic cloudlet fog node deployment architecture, in accordance with aspects of the subject disclosure.

FIG. 5 provides depiction of a system 500 for automatically preconditioning and certifying the deployment of network hardware prior to installation of network services, in accordance with various embodiments. System 500 provides additional description in regard to management switch device 108. As illustrated, management switch device 108 can comprise collection engine 502 that can be coupled to processor 504, memory 506, and storage 508. Collection engine 502 can be in communication with processor 504 for facilitating operation of computer or machine executable instructions and/or components by collection engine 502, memory 506 for storing data and/or the computer or machine executable instructions and/or components, and storage 508 for providing longer term storage of data and/or machine and/or computer executable instructions. Further, management switch device 108 can also receive input 510 for use, manipulation, and/or transformation by collection engine 502 to produce one or more useful, concrete, and tangible result and/or transform one or more articles to different states or things. Further, management switch device 108 can also generate and output the useful, concrete, and tangible result and/or the transformed one or more articles produced by collection engine 502 as output 512.

Collection engine 502 can collate and collect various configuration data indicative of routing data and/or IP data upon which the routing data can have been based. The IP data can have been used, by the seed server device, for example, to initiate/establish the PXE network. The IP data can comprise private IP data and public IP data, wherein the private IP data can be employed within the PXE network and the public IP data can be used to access network devices of groupings of networked devices associated with at least one MNO entity. As will be appreciated by those ordinarily skilled in the art, for the purposes of the subject disclosure, since the devices (e.g. service 104, application switch device 106, and/or management switch device 108) pertaining to the intended data center to which the subject disclosure is directed will not have access to the greater network facilities of the MNO entity, the public IP address can be putative public IP addresses rather than actual public IP addresses.

Management switch device 108, in accordance with some embodiments can be any type of mechanism, machine, device, apparatus, and/or instrument comprising at least a processor and/or a capability for effective and/or operative communication with a network topology. For instance, in some embodiments, management switch device 108 can include mechanisms, machines, devices, facilities, and/or instruments, such as virtual reality (VR) devices, wearable devices, heads up display (HUD) devices, machine type communication devices, and/or wireless devices that communicate with radio network nodes in a cellular or mobile communication system. In other embodiments, management switch device 108 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Figure 6:
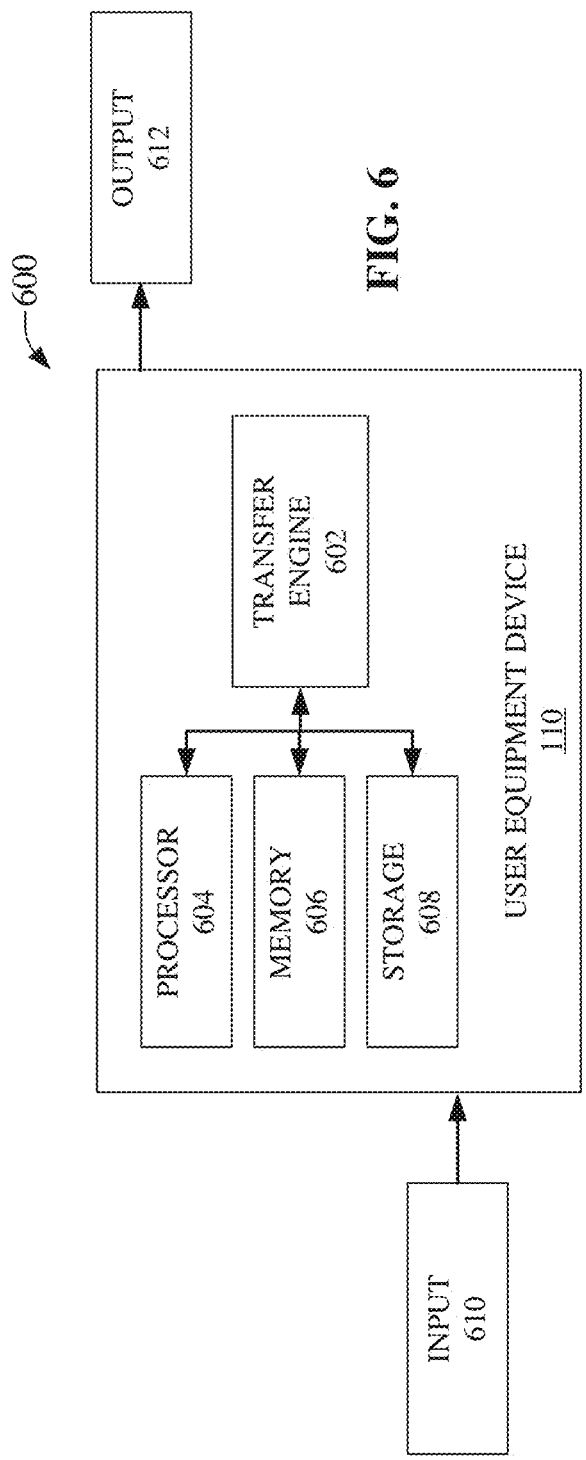
FIG. 6 provides further depiction of a system for the provision of a dynamic cloudlet fog node deployment architecture, in accordance with aspects of the subject disclosure.

FIG. 6 provides depiction of a system 600 for automatically preconditioning and certifying the deployment of network hardware prior to installation of network services, in accordance with various embodiments. System 600 provides further detail with regard to user equipment device 110. As depicted, user equipment device 110 can comprise transfer engine 602 coupled to processor 604, memory 606, and storage 608. Transfer engine 602 can be coupled to processor 604 for facilitating operation of computer or machine executable instructions and/or components by transfer engine 602, memory 606 for storing data and/or the computer or machine executable instructions and/or components, and storage 608 for providing longer term storage of data and/or machine and/or computer executable instructions. User equipment device 110 can also receive input 610 for use, manipulation, and/or transformation by transfer engine 602 to produce one or more useful, concrete, and tangible result and/or transform one or more articles to different states or things. Further, user equipment device 110 can also generate and output the useful, concrete, and tangible result and/or the transformed one or more articles produced by transfer engine 602 as output 612.

Transfer engine 602, in response to receiving data associated with a report comprising at least consolidated and cross-checked data from the seed server device, transfer engine 602 can display the report, as a webpage(s), to a display device (not shown) associated with user equipment device 110. Further, transfer engine 602 can also upload the report to a central site for further analysis and/or, if necessary, additional action. Uploading of the report to a central server site will generally take place at a subsequent time and/or place is because the data center or cloud service center to which the subject disclosure pertains will typically not have access to the wider network topologies that can be controlled by one or more MNO entities, since the data center/cloud service center, at this stage, will generally not be fully functional, and for all intents and purposes, aside from a supply of mains electricity to the above noted devices, will not have an outside network connectivity and/or be fully operable.

In view of the example system(s) described above, example method(s) that can be implemented in accordance with the disclosed subject matter can be better appreciated with reference to the flowcharts in FIGS. 7-10. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 7:
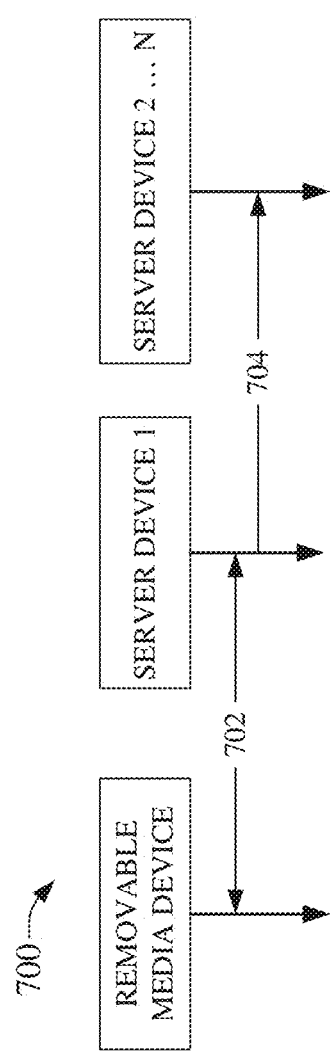
FIG. 7 provides additional illustration of a system for the provision of a dynamic cloudlet fog node deployment architecture, in accordance with aspects of the subject disclosure.

FIG. 7 illustrates a method 700 for automatically preconditioning and certifying the deployment of network hardware prior to installation of network services, in accordance with various embodiments. Method 700 can commence at 702 wherein in response to a supply of electrical power (e.g., battery and/or mains power) being conveyed to, and a removable media device (e.g., removable media device 102) being brought into wireless and/or wired communication with, a first server device (e.g., server device 1), the first server device heretofore identified as the "seed server device" (e.g., server device 104A) can download, install, and/or initiate execution of a version of a bootable image persisted on the removable media device by the seed server device. Execution of the bootable image on the seed service device causes a kernel operating system to become function on the seed service device. The operational kernel operating system can provide an interface between a user of the seed server device (or one or more process interfacing with the seed server device) and the various underlying and/or associated computer hardware and/or peripheral devices that can comprise the seed server device.

Once the seed server device has become operable with the kernel operating system, any second server devices 2 . . . N (e.g., server device 104B . . . server device 104V), in some embodiments, in response to electrical power being supplied to these second server devices 2 . . . N, at 704, can download and/or execute one or more bootable images that can have been stored to the seed server device.

Figure 8:
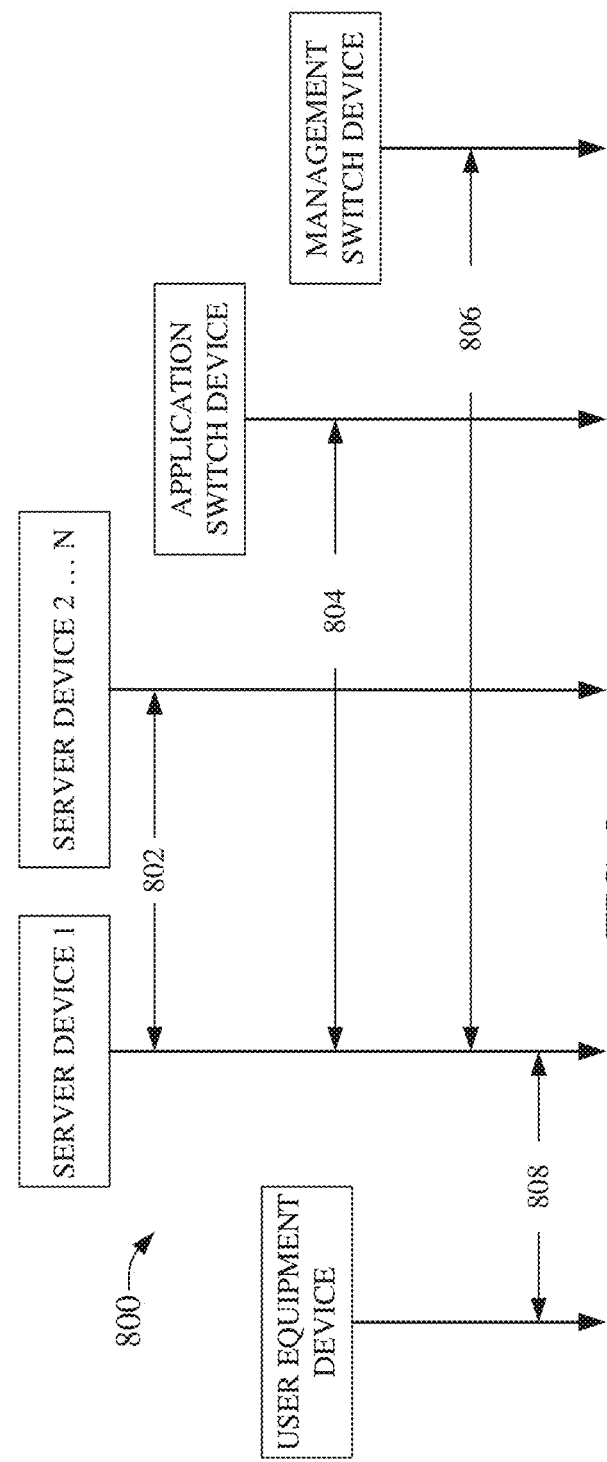
FIG. 8 provides illustration of a flow chart or method for the provision of a dynamic cloudlet fog node deployment architecture, in accordance with described embodiments of the subject disclosure.

FIG. 8 illustrates an additional method 800 for automatically preconditioning and certifying the deployment of network hardware prior to installation of network services, in accordance with various embodiments. Method 800 can commence at act 802 wherein a first server device (server device 1—the seed server device) can initially configure and/or establish a PXE network using a grouping of private IP addresses. Also at 802 the first server device, using the instantiated PXE network, can also execute and/or instantiate, on the first server device, one or more DHCP service, TFTP service, HTTP service, and/or LLDP service. Additionally, the first server device can execute and/or instantiate a process to harvest configuration data from a group of second server devices (e.g., server device 2 . . . N or server device 104A . . . server device 104B).

At 804 and 806 routing data comprising internet protocol (IP) data upon which the routing data can have been based can be solicited and/or received from a management switch device and/or an application switch device. The IP data can have been used to initiate/establish the PXE network. Further, the IP data can comprise "private" IP data and/or "public" IP data. Additionally at 804 and/or 806 LLDP data can be obtained from the management switch device as well as the application switch device.

At 808 server device 1 can consolidate and cross-check the configuration data that can have been harvested earlier from the entirety of the server devices (e.g., server device 1 . . . N), and the routing data representative of private IP addresses on the PXE network to public IP addresses with the previously harvested LLDP data obtained from the management switch device and/or from the application switch device to verify connections and/or interconnections between one or more of the various installed devices. Additionally and/or alternatively at 808, server device 1 can compare the configuration data harvested from the entirety of the server devices (e.g., server device 1 . . . N) and representing routing data indicative of routes from private IP addresses on the PXE network to public IP addresses with pre-established configuration data (e.g., data/information containing rack locations, wiring, and routing diagrams/layouts that can outline the planned or proposed setup of a storage farm, a remote data center, or a offsite cloud service center).

Also at 808 a user equipment device in response to receiving data associated with a report comprising at least consolidated and cross-checked data from server device 1, can display the report, as a webpage(s), to a display device associated with the user equipment device. Further, 808 the report can be uploaded to a central site for further analysis and/or, if necessary, additional action.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
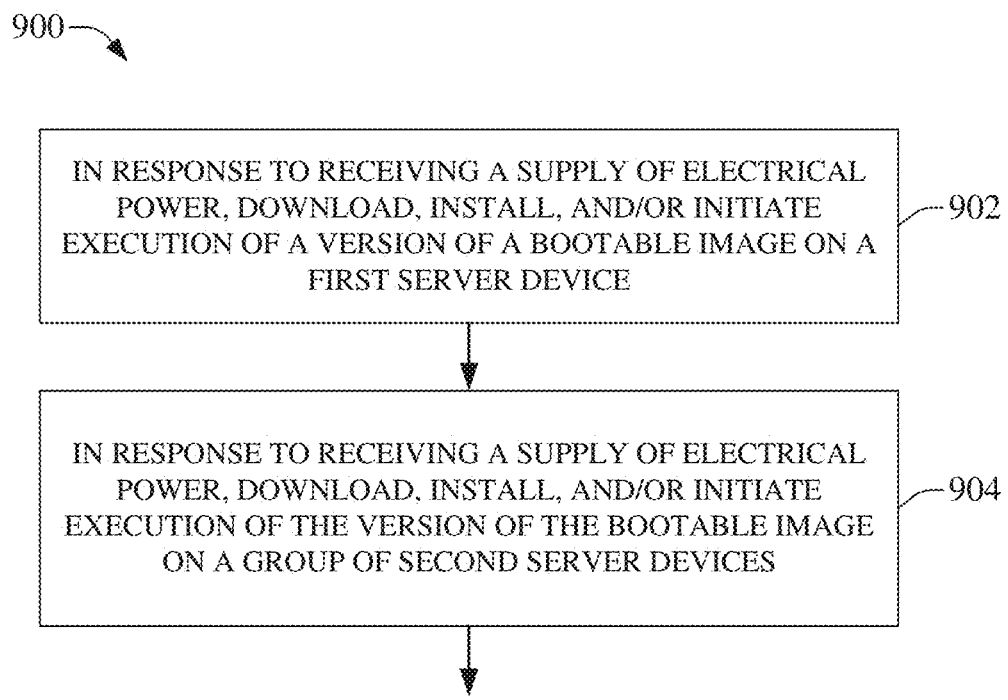
FIG. 9 provides depiction of a flow chart or method for the provision of a dynamic cloudlet fog node deployment architecture, in accordance with described embodiments of the subject disclosure.

FIG. 9 illustrates an additional method 900 for automatically preconditioning and certifying the deployment of network hardware prior to installation of network services, in accordance with various embodiments. Method 900 can commence at 902 where in response to receiving a supply of electrical power, download, install, and/or execute a version of a bootable image on a first server device. At act 904 in response to receiving a supply of electrical power, download, install, and/or initiate execution of the version of the bootable image on a group of second server devices.

Figure 10:
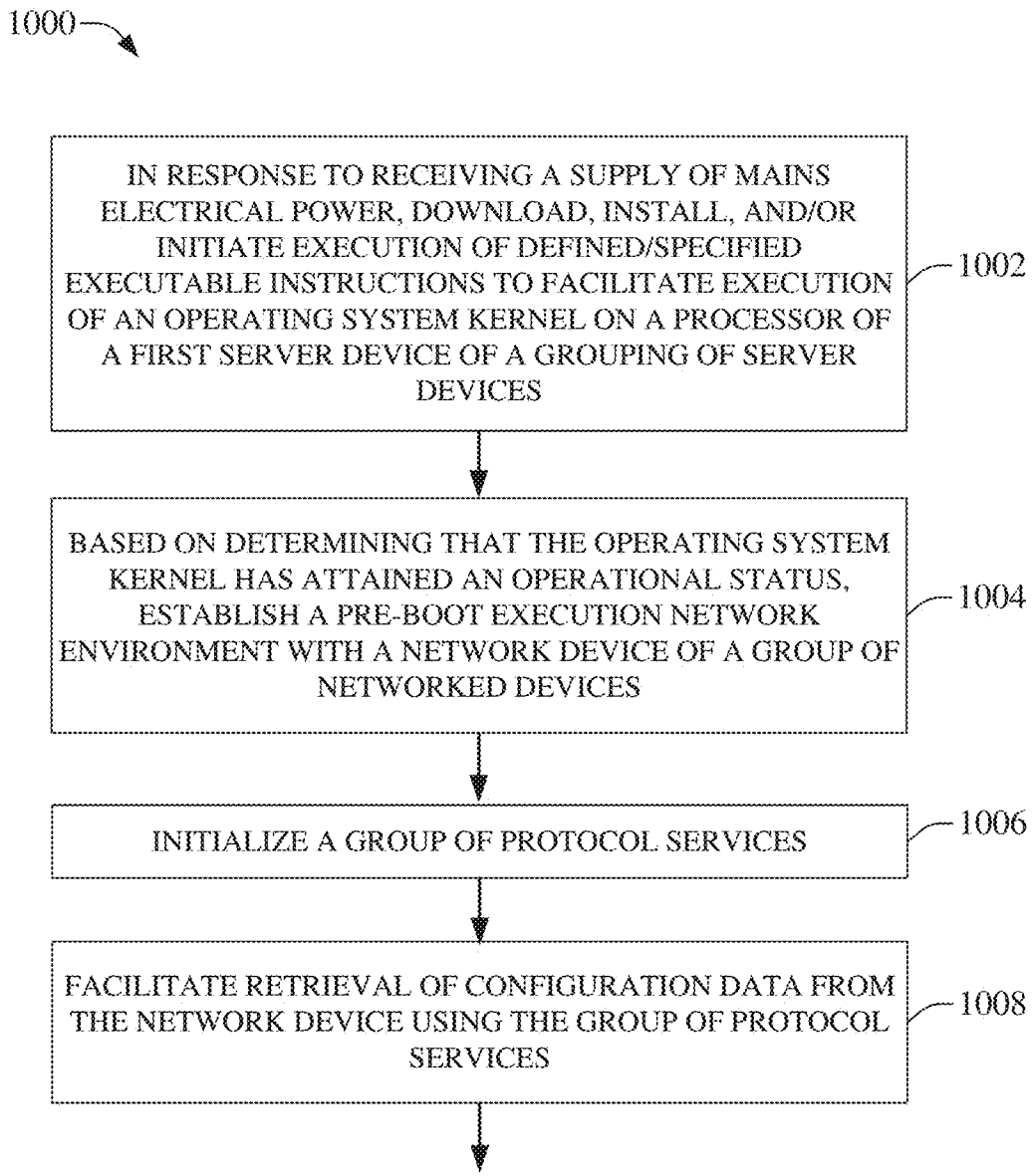
FIG. 10 provides additional illustration of a flow chart or method for the provision of a dynamic cloudlet fog node deployment architecture, in accordance with described embodiments of the subject disclosure.

FIG. 10 depicts an additional method 1000 for automatically preconditioning and certifying the deployment of network hardware prior to installation of network services, in accordance with various embodiments. Method 1000 can commence at act 1002 wherein in response to receiving a supply of mains electrical power, download, install, and/or initiate execution of defined/specified executable instructions to facilitate execution of an operating system kernel on a processor of a first server device of a grouping of server devices. At act 1004, based on determining that the operating system kernel has attained an operational status, establish a pre-boot execution network environment with a network device of a group of networked devices. At act 1006, initialize a group of protocol services, and at act 1008, facilitate retrieval of configuration data from the network device using the group of protocol services.

Figure 11:
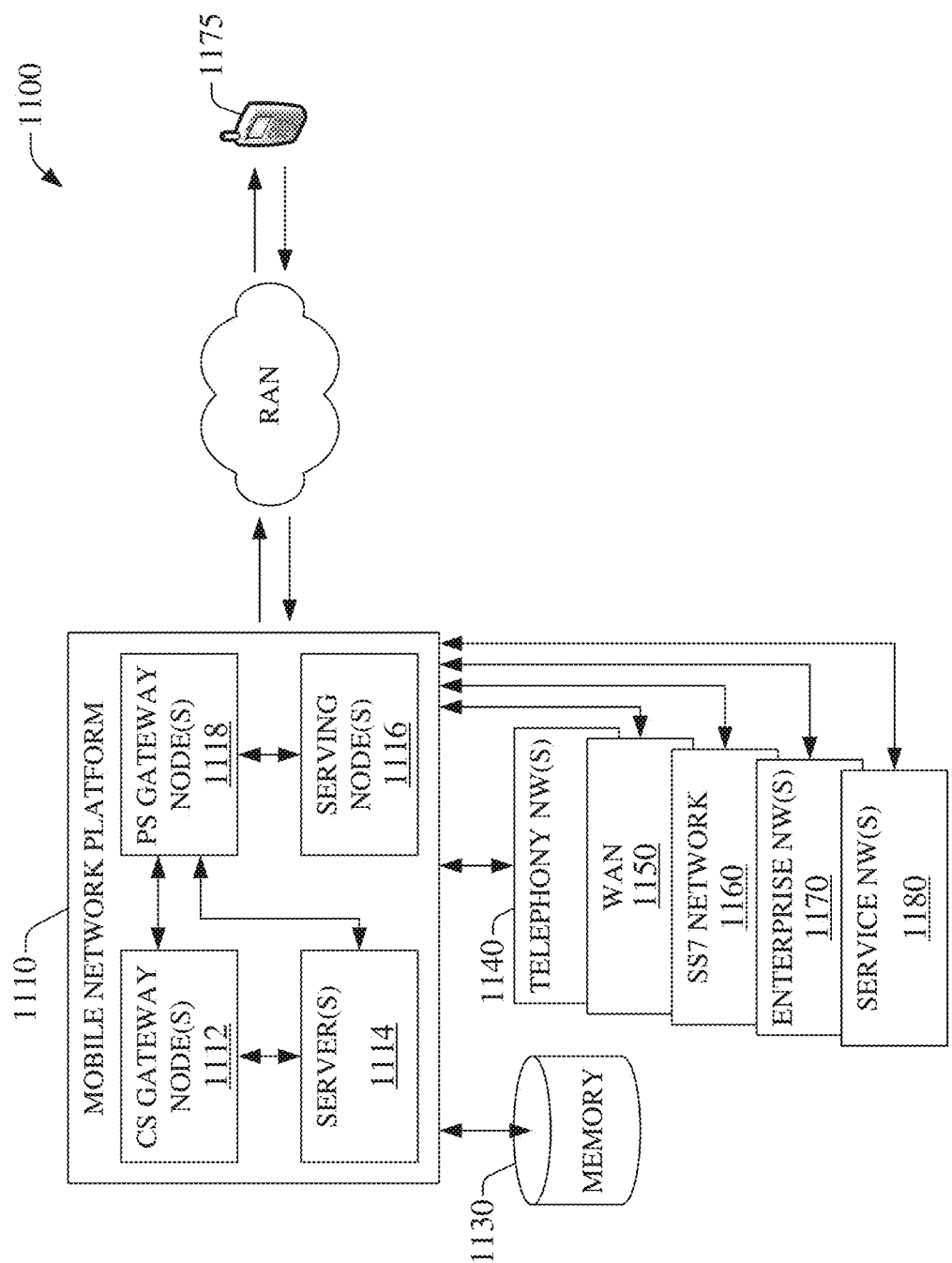
FIG. 11 is a block diagram of an example embodiment of a mobile network platform to implement and exploit various features or aspects of the subject disclosure.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
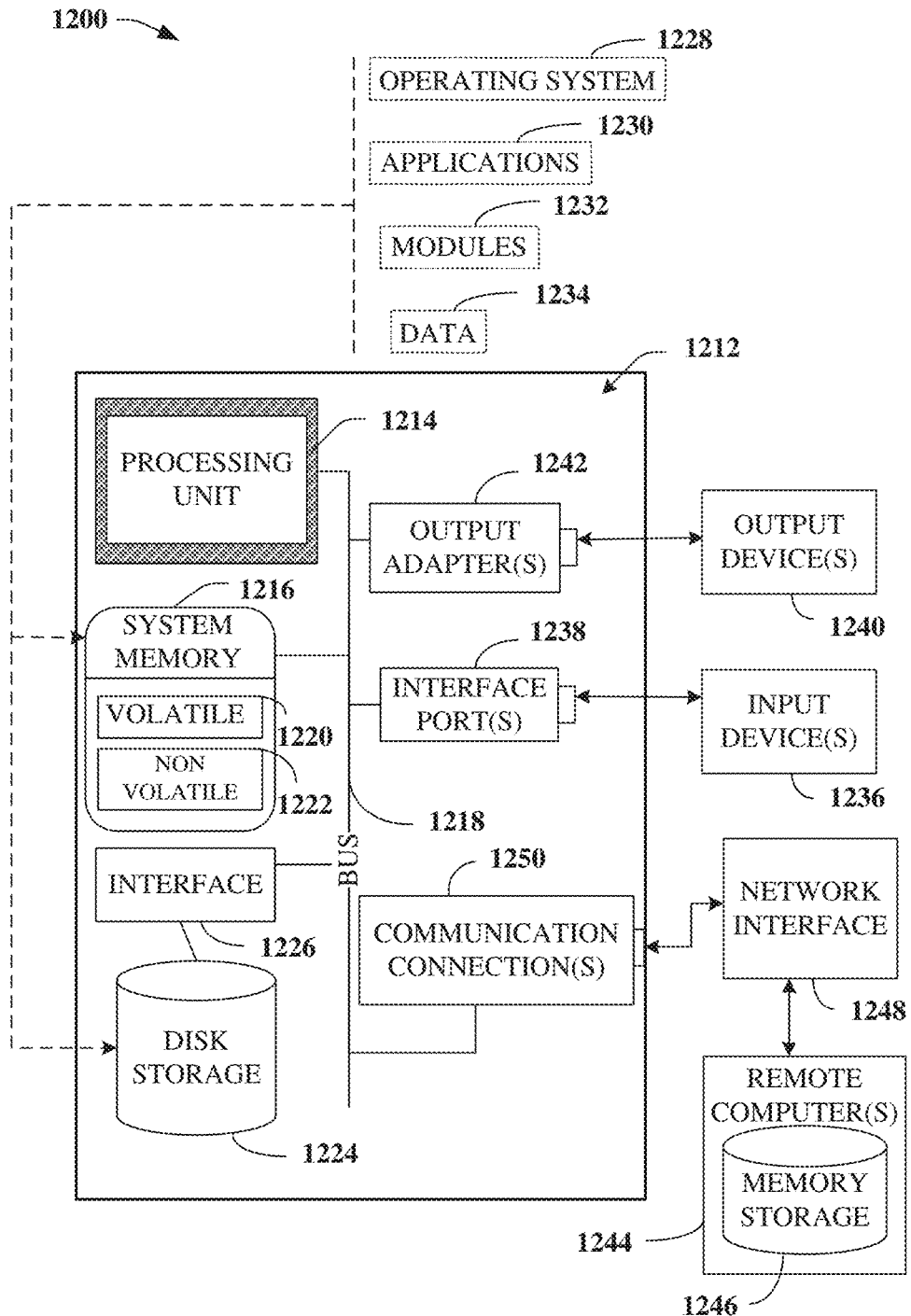
FIG. 12 illustrates a block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 120, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MS A), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   in response to receiving electrical power from a mains power supply, downloading specified executable instructions to facilitate execution of an operating system kernel by the processor;
   based on determining that the operating system kernel has attained an operational status, establishing a pre-boot execution network environment with network equipment of a group of network equipment;
   initializing a group of protocol services; and
   facilitating retrieval of configuration data from the network equipment device using the group of protocol services.

2. The device of claim 1, wherein the group of network equipment comprises a group of servers.

3. The device of claim 2, wherein the processor is a first processor, and wherein the group of servers comprises a server comprising a second processor.

4. The device of claim 3, wherein the operating system kernel is a first operating system kernel, and wherein the second processor facilitates downloading the specified executable instructions to facilitate execution of a second operating system kernel by the second processor.

5. The device of claim 4, wherein the second processor initiates a link layer daemon process on a grouping of interface ports associated with the server.

6. The device of claim 2, wherein the network equipment is included in the group of servers.

7. The device of claim 1, wherein the group of network equipment further comprises an application switch device.

8. The device of claim 1, wherein the group of network equipment further comprises a management switch device.

9. The device of claim 1, wherein the specified executable instructions are stored on a removable media device.

10. The device of claim 9, wherein, in further response to the receiving of the electrical power from the mains power supply, the removable media device is moved within a near field wireless communications range with the device to initiate downloading of the specified executable instructions.

11. A method, comprising:
in response to receiving electrical power from a mains power supply, downloading, by a system comprising a processor, executable instructions corresponding to a facilitation of an execution of an operating system kernel via the processor;
determining, by the system, that the operating system kernel has attained an operational status;
based on the determining, facilitating, by the system, establishing a pre-boot execution network environment with a device of a group of devices;
initializing, by the system, a group of protocol services; and
facilitating, by the system, retrieval of configuration data from the device using the group of protocol services.

12. The method of claim 11, wherein the group of devices comprises an application switch device of a pairing of application switch devices, a server device of a grouping of server devices, and a management switch device.

13. The method of claim 12, wherein the processor is a first processor, wherein the executable instructions are a first version of the executable instructions, and wherein the server device downloads the first version of the executable instructions and facilitates execution of the first version of the executable instructions via a second processor.

14. The method of claim 13, wherein the second processor facilitates execution of a link layer discovery process on a collection of ports associated with the server device.

15. The method of claim 13, wherein the executable instructions are a second version of the executable instructions, and wherein the application switch device downloads the second version of the executable instructions and facilitates execution of the second version of the executable instructions via a third processor.

16. The method of claim 15, wherein the executable instructions are a third version of the executable instructions, and wherein the management switch device downloads the third version of the executable instructions and facilitates execution of the third version of the executable instructions via a fourth processor.

17. A non-transitory machine-readable medium, comprising executable instructions that, when executed by a processor, facilitate performance of operations, comprising:
in response to receiving electrical power from a mains power supply, downloading specific executable instructions to facilitate execution of an operating system kernel by the processor;
determining that the operating system kernel has attained an operational status;
based on the determining, establishing a pre-boot execution network environment with a device of a group of devices;
initializing a group of protocol services; and
facilitating retrieval of configuration data from the device using the group of protocol services.

18. The non-transitory machine-readable medium of claim 17, wherein the specific executable instructions are stored on a removable device.

19. The non-transitory machine-readable medium of claim 17, wherein the processor uses the pre-boot execution network environment and facilitates the retrieval of the configuration data.

20. The non-transitory machine-readable medium of claim 17, wherein the processor executes an out-of-band management processor to facilitate the retrieval of the configuration data.

* * * * *